US008514598B2

(12) United States Patent
Barauna

(10) Patent No.: US 8,514,598 B2
(45) Date of Patent: Aug. 20, 2013

(54) POWER CONVERTER COMPRISING AN INVERTER MODULE USING NORMALLY ON FIELD-EFFECT TRANSISTORS

(75) Inventor: Allan Pierre Barauna, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 13/529,220

(22) Filed: Jun. 21, 2012

(65) Prior Publication Data

US 2013/0016540 A1 Jan. 17, 2013

(30) Foreign Application Priority Data

Jul. 13, 2011 (FR) ...................................... 11 56382

(51) Int. Cl.
*H02M 7/537* (2006.01)
(52) U.S. Cl.
USPC ............................................ 363/49; 363/131
(58) Field of Classification Search
USPC .................. 363/37, 39, 40, 49, 55, 56.01, 131
See application file for complete search history.

(56) References Cited

U.S. PATENT DOCUMENTS

| | | | | |
|---|---|---|---|---|
| 5,896,282 A * | 4/1999 | Wu | ................. | 363/96 |
| 6,282,104 B1 * | 8/2001 | Kern | ................. | 363/34 |
| 7,920,393 B2 * | 4/2011 | Bendre et al. | ................. | 363/39 |
| 7,952,896 B2 * | 5/2011 | Hu et al. | ................. | 363/37 |
| 8,068,352 B2 * | 11/2011 | Yu et al. | ................. | 363/17 |
| 8,233,294 B2 * | 7/2012 | Chen et al. | ................. | 363/40 |
| 8,248,325 B2 * | 8/2012 | Danstrom | ................. | 345/46 |
| 8,295,067 B2 * | 10/2012 | Grbovic | ................. | 363/89 |
| 2009/0212726 A1 | 8/2009 | Baudesson et al. | | |
| 2010/0295523 A1 | 11/2010 | Grbovic | | |

FOREIGN PATENT DOCUMENTS

| | | |
|---|---|---|
| EP | 2 093 871 A1 | 8/2009 |
| EP | 2 267 880 A1 | 12/2010 |
| FR | 2 943 474 | 9/2010 |

OTHER PUBLICATIONS

Thomas Friedli, et al., "Design and Performance of a 200-kHz All-SiC JFET Current DC-Link Back-to-Back Converter", IEEE Transactions on Industry Applications, vol. 45, No. 5, XP011270486, Sep. 1, 2009, pp. 1868-1878.

French Preliminary Search Report and Written Opinion issued Mar. 29, 2012, in French 1156382, filed Jul. 13, 2011 (with English Translation of Categories of Cited Documents).

* cited by examiner

*Primary Examiner* — Adolf Berhane
(74) *Attorney, Agent, or Firm* — Oblon, Spivak, McClelland, Maier & Neustadt, L.L.P.

(57) ABSTRACT

A power converter includes a DC power supply bus having a positive power supply line (10) and negative power supply line (11). A limiting resistor (RL) is connected in series with the negative power supply line (11) of the DC power supply bus and is designed to limit the charging current of the bus capacitor (Cbus). An inverter module has upper transistors (T2, T4, T6) and lower transistors (T1, T3, T5) in series of the normally ON field-effect type, and several Grid control devices (CT1-CT6) allow each to apply a Grid voltage to the transistors for controlling each transistor so as to turn off or to turn on. A start-up source (Sd) is connected in parallel with the limiting resistor and to each Grid control device (CT1, CT3, CT5) for the lower transistors, and is configured for charging with a negative voltage when the power converter starts up.

7 Claims, 2 Drawing Sheets

POWER CONVERTER COMPRISING AN INVERTER MODULE USING NORMALLY ON FIELD-EFFECT TRANSISTORS

FIELD OF THE INVENTION

The present invention relates to a power converter comprising field-effect transistors of the normally ON type.

DESCRIPTION OF THE PRIOR ART

It is known that a power converter designed to control an electrical load mainly comprises:
- a DC power supply bus to which a rectified voltage is applied, the DC power supply bus being equipped with one or more bus capacitors allowing the bus voltage to be maintained at a constant value,
- at the output, an inverter module designed to transform the voltage on the DC power supply bus into a variable voltage to be applied to the electrical load.

The converter may also comprise a rectifier module at its input, as a general rule composed of a diode bridge, designed to rectify the AC voltage supplied by an electrical distribution system.

The inverter module comprises several switching arms, as a general rule three switching arms connected to the positive line and to the negative line of the DC power supply bus. For the inverter module, the transistors employed are for example field-effect transistors and of the normally ON type, their Drain-Source channel being conducting in the absence of a control voltage applied to their Grid. In order to cause it to turn off, each transistor must thus be controlled by means of a specific control device allowing a suitable control voltage to be applied to it. The control devices for the transistors are powered by an auxiliary power supply system connected to the positive line and to the negative line of the DC power supply bus.

When the power converter is powered up, the auxiliary power supply system is not charged, thus preventing any control signals from being applied to the transistors. Even if the inverter module employs field-effect transistors of the normally ON type, upon power up, the charging of the bus capacitor must be enabled in order to charge the auxiliary power supply system.

The aim of the invention is to provide a power converter employing switching arms using normally ON components and allowing the rise in voltage of the bus upon power up.

DESCRIPTION OF THE INVENTION

This goal is achieved by a power converter designed to control an electrical load, comprising:
- a DC power supply bus to which a rectified voltage is applied and comprising a positive power supply line and a negative power supply line,
- an inverter module connected upstream to the DC power supply bus and downstream to several output phases,
- a bus capacitor, connected to the positive power supply line and to the negative power supply line of the DC power supply bus,
- a limiting resistor connected in series on the negative power supply line of the DC power supply bus, upstream of the bus capacitor and designed to limit the charging current of the bus capacitor,
- the inverter module comprising several switching arms connected between the positive power supply line and the negative power supply line of the DC power supply bus, each switching arm comprising an upper transistor and a lower transistor in series and a centre connection point situated between the upper transistor and the lower transistor and connected to an electrical load, the upper and lower transistors being of the normally ON field-effect type,
- several Grid control devices each allowing a Grid voltage to be applied to the upper transistors and lower transistors for controlling them so as to close or to open,
- in the converter, the Grid control devices for the lower transistors are each connected to the negative power supply line of the DC power supply bus and the converter comprises a start-up source connected in parallel with the limiting resistor and to each Grid control device for the lower transistors and configured for charging with a negative voltage when the power converter starts up.

According to one feature, the start-up source comprises a capacitor and a Zener diode connected in parallel and connected to the negative power supply line and to the Grid control device for each lower transistor.

According to another feature, the start-up source also comprises a resistor and a diode connected, on the one hand, to the Zener diode and, on the other, to the limiting resistor.

According to another feature, the start-up source is connected to each Grid control device for the lower transistors via a resistor.

According to another feature, the power converter comprises a switch connected in parallel with the limiting resistor.

According to another feature, the upper transistors and the lower transistors of the switching arms are of the JFET type.

According to another feature, the upper transistors and the lower transistors of the JFET type are fabricated in silicon carbide or gallium nitride.

BRIEF DESCRIPTION OF THE FIGURES

Other features and advantages will become apparent in the detailed description that follows presented with regard to the appended drawings in which.

DETAILED DESCRIPTION OF AT LEAST ONE EMBODIMENT

Figure 1:
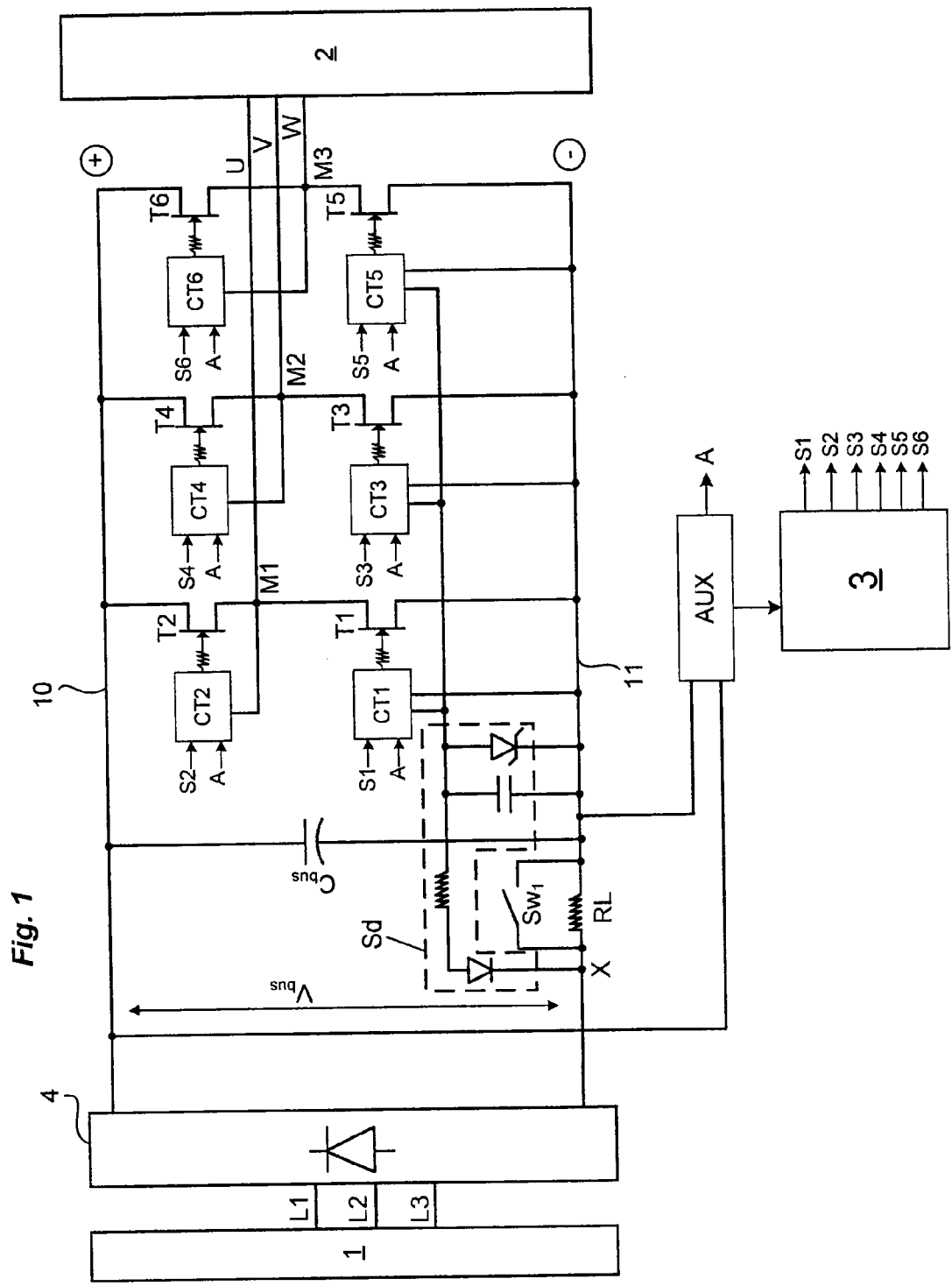
FIG. 1 shows the circuit diagram of a power converter according to the invention.

A power converter is for example designed to apply an output voltage to an electrical load 2. With reference to FIG. 1, a power converter for example comprises:
- a DC power supply bus receiving a rectified voltage and having a positive power supply line 10 and a negative power supply line 11,
- a bus capacitor $C_{bus}$ connected, on the one hand, to the positive power supply line 10 of the DC power supply bus and, on the other hand, to the negative power supply line 11 of the DC power supply bus and designed to maintain constant the DC power supply bus voltage $V_{bus}$,
- an inverter module connected to the DC power supply bus, downstream of the bus capacitor $C_{bus}$, comprising n phases and having at least two switching transistors on each phase. In FIG. 1, the inverter module has three phases U, V, W and hence comprises three switching arms each connected to the positive power supply line 10 and to the negative power supply line 11 of the DC power supply bus. Each switching arm comprises an upper transistor T2, T4, T6 and a lower transistor T1, T3, T5 separated by a centre connection point M1, M2, M3 designed to be connected to the electrical load 2.

a limiting resistor RL, also referred to as pre-charging resistor, connected in series on the negative power supply line 11, between the rectifier module 4 and the bus capacitor $C_{bus}$ and in parallel with which a switch $Sw_1$ is connected. This limiting resistor RL is active at start up during the charging phase of the DC power supply bus. In an variable speed drive, it allows the input current to be limited through the rectifier module 4. Once the bus capacitor $C_{bus}$ is charged up, the limiting resistor RL is short-circuited by the first switch $Sw_1$ connected in parallel.

As shown in FIG. 1, a power converter such as variable speed drive also comprises at its input:

three input phases L1, L2, L3 connected to an electrical power distribution system 1, a rectifier module 4 connected to the three input phases L1, L2, L3 and designed to rectify an AC voltage supplied by the electrical power distribution system 1, the rectified voltage being applied to the DC power supply bus.

In the inverter module, each transistor T1-T6 of the switching module is of the field-effect type (FET for "Field Effect Transistor"). A field-effect transistor, such as for example a JFET or a MOSFET, is a known power electronic switch which comprises a control Grid (G) whose function is to allow or not allow a current to flow between a Drain (D) and a Source (S). Such a transistor is said to be of the normally ON type if its Drain-Source channel is conducting in the absence of a control voltage $V_{GS}$. In the presence of a control voltage $V_{GS}$ between its Gate G and its Source S, which is negative, the normally ON field-effect transistor is controlled so as to turn off. A transistor of the JFET type is controlled so as to turn off by applying a Grid-Source voltage $V_{GS}$ for example equal to at least −15 Volts and a transistor of the MOSFET type with a voltage $V_{GS}$ for example zero or negative. Furthermore, the transistor is said to be of the normally OFF type if, in the absence of a voltage $V_{GS}$ between Grid and Source, the Drain-Source channel is not conducting. It therefore requires a Grid-Source $V_{GS}$ voltage which is positive in order to be controlled so as to turn ON. For a transistor of the normally OFF JFET type, this positive voltage is for example in the range between +1 Volt and +3 Volts.

The field-effect transistors employed in the power converter of the invention will, for example, be fabricated with a wide band-gap material such as for example silicon carbide or gallium nitride. In a known manner, a JFET transistor formed from a wide band-gap material and of the normally ON type has the advantages of being faster to switch, of generating lower conduction losses in the conducting state (low resistance $R_{DSon}$ in the ON state), of having a better temperature stability and of being smaller. In the following part of the description and in FIG. 1, the transistors T1-T6 used are for example of the normally ON JFET type.

Each field-effect transistor T1-T6 of the switching arms is controlled so as to turn OFF thanks to a specific Grid control device CT1-CT6, via a Grid resistor $R_G$. Each Grid control device CT1-CT6 is supplied (A) by means of an auxiliary power supply system AUX connected to the positive power supply line 10 and to the negative power supply line 11 of the DC power supply bus and allows a Grid voltage $V_G$ to be applied to the transistor for controlling the transistor so as to turn ON or to turn OFF. In addition to the power supply (A), each control device CT1-CT6 receives, from a central control system 3, control signals S1 to S6 using Pulse Width Modulation (or PWM) complying with a control law executed by the central control system 3.

Figure 2:
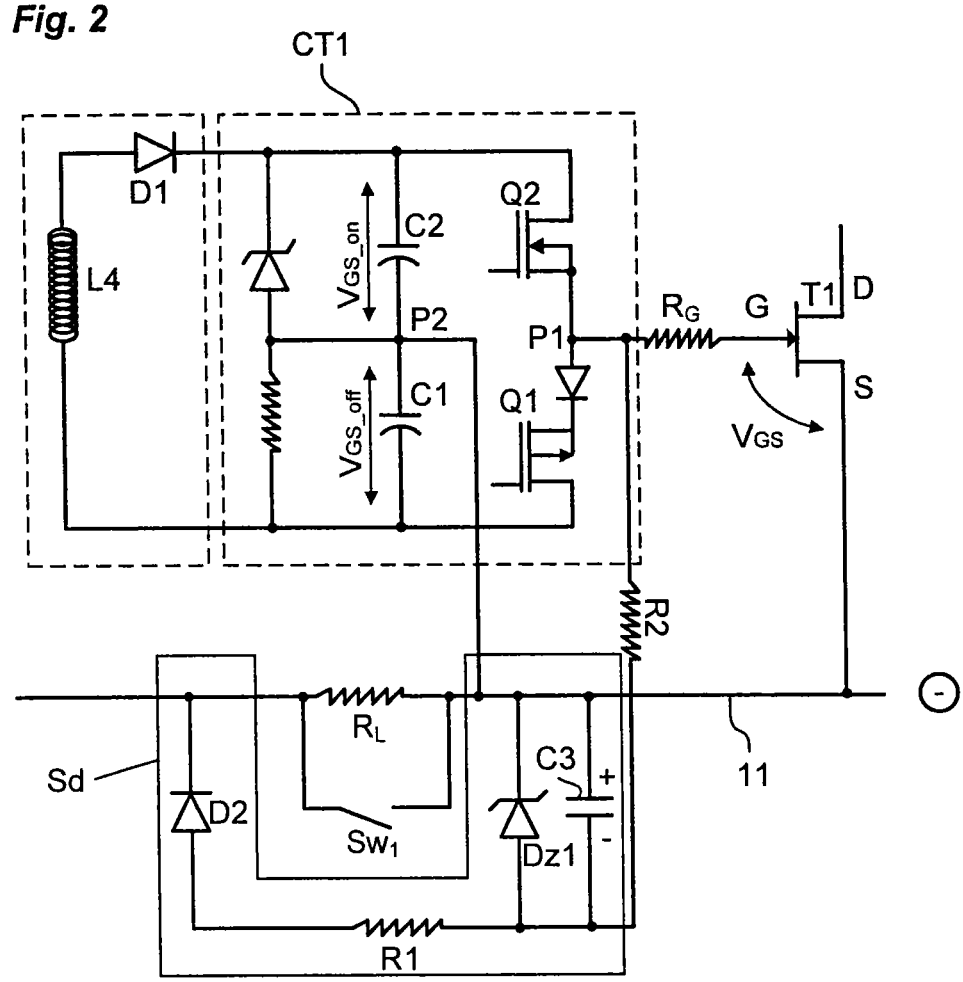
FIG. 2 shows a lower transistor of the inverter module of the power converter of the invention and its control device.

With reference to FIG. 2, a Grid control device, such as that of the lower transistor T1, comprises notably two transistors Q1, Q2 of the MOSFET type connected in series via a centre connection point P1 connected to the Grid G of the transistor T1, via the Grid resistor $R_G$, and an assembly of two capacitors C1, C2 also connected in series. A centre connection point P2 situated between the two capacitors C1, C2 is connected to the negative line 11 of the DC power supply bus, in other words to the Source S of the controlled transistor (here T1). The transistor Q1 of the control device is of the normally OFF type whereas the transistor Q2 of the control device is of the normally ON type. The auxiliary power supply system AUX supplies the Grid control device through a diode D1 and an inductance L4 which corresponds to the secondary of the transformer of the auxiliary power supply system AUX by generating the voltages $V_{GS}$_ON and $V_{GS}$_OFF respectively needed for turning ON and turning OFF the transistor T1. Using these voltages $V_{GS}$_ON and $V_{GS}$_OFF, the transistors Q1, Q2 apply the Grid voltage $V_G$ to the transistor JFET for controlling it so as to turn OFF or to turn ON.

In the following part of the description, it will be considered that each Grid control device has the same architecture and is described by the same references.

Each Grid control device CT2, CT4, CT6 for the upper transistors T2, T4, T6 is for example connected to the centre connection point M1, M2, M3 of the switching arm of its transistor whereas each control device CT1, CT3, CT5 for the lower transistors T1, T3, T5 is connected, via its mid-point P2, to the Source of the lower controlled transistor T1, T3, T5.

Furthermore, the converter also comprises a start-up source Sd activated during the start-up phase of the power converter for controlling the lower transistors T1, T3, T5 of the inverter module to turn OFF for the start-up time and thus to allow the bus capacitor $C_{bus}$ to be charged up.

Preferably, the start-up source Sd is common to all the lower transistors T1, T3, T5 of the inverter module and thus allows the three switching arms to be controlled so as to turn OFF during the start-up phase of the power converter.

This start-up source Sd comprises a capacitor C3 connected to the negative power supply line 11 of the DC power supply bus, to the Source S of each lower transistor, and to the mid-point P1 of the two transistors Q1, Q2 of each Grid control device for the lower transistors T1, T3, T5 via a resistor R2, forming an impedance between the point P1 and the start-up source Sd. The start-up source Sd also comprises a Zener diode Dz1 also connected to the negative line 11 of the DC power supply bus, to the Source S of each lower transistor, and to the mid-point P1 via the resistor R2. Furthermore, the start-up source Sd also comprises a resistor R1 and a diode D2 connected, on the one hand, to the Zener diode Dz1 and to the capacitor C3 and, on the other hand, to a terminal of the limiting resistor.

The start-up source Sd is thus connected in parallel with the limiting resistor RL and to each Grid control device CT1, CT3, CT5 for the lower transistors T1, T3, T5.

The operation of the power converter of the invention is presented hereinbelow by focussing on a single switching arm and on the lower transistor T1. It should be understood that the operation is similar for the other switching arms.

In the initial state, no input voltage is applied to the DC power supply bus. The voltage of the DC power supply bus $V_{bus}$ is therefore zero and the auxiliary power supply system AUX is not activated. The transistors T1-T6 of the switching module are in the ON state.

When the variable speed drive is started up, the voltages $V_{DS1}$ and $V_{DS2}$ between Drain and Source of the two transistors T1, T2 of the switching arm are zero given that these transistors are conducting. The auxiliary power supply system AUX is not yet activated and cannot therefore supply a sufficient voltage to make these transistors T1, T2 non-conducting. As the switching arms short-circuit the bus capacitor $C_{bus}$, the current flowing in these switching arms and the limiting resistor RL leads to a voltage drop across the terminals of the limiting resistor RL. This voltage drop across the terminals of the limiting resistor RL leads to the charging of the capacitor C3, creating a negative voltage between the Grid G and the Source S of the transistor T1. When the voltage across the terminals of the capacitor C3 becomes lower than a threshold voltage corresponding to the turn-off voltage of the transistor T1, the transistor T1 is switched to the OFF state, then allowing the bus capacitor to be charged up.

Once the auxiliary power supply system AUX has finished its start-up phase, it can power the control devices CT1-CT6 for the transistors T1-T6 of the inverter module. The transistors T1-T6 can therefore be directly controlled so as to turn off by their control device CT1-CT6. Once the bus capacitor $C_{bus}$ is charged up, the limiting resistor RL can be short-circuited by the switch $Sw_1$ during normal operation of the variable speed drive.

With a simple and low-cost assembly, it is thus possible to overcome the limitations associated with the use of normally ON components in the inverter module of a variable speed drive.

The invention claimed is:

1. Power converter designed to control an electrical load, comprising:
    a DC power supply bus to which a rectified voltage is applied and comprising a positive power supply line and a negative power supply line,
    an inverter module connected upstream to the DC power supply bus and downstream to several output phases,
    a bus capacitor, connected to the positive power supply line and to the negative power supply line of the DC power supply bus,
    a limiting resistor connected in series with the negative power supply line of the DC power supply bus, upstream of the bus capacitor, and designed to limit the charging current of the bus capacitor,
    the inverter module comprising several switching arms connected between the positive power supply line and the negative power supply line of the DC power supply bus, each switching arm comprising an upper transistor and a lower transistor in series and a centre connection point situated between the upper transistor and the lower transistor and connected to the electrical load, the upper and lower transistors being of the normally ON field-effect type,
    several Grid control devices each allowing a Grid voltage to be applied to the upper transistors and lower transistors for controlling them so as to close or to open, wherein,
    the Grid control devices for the lower transistors are each connected to the negative power supply line of the DC power supply bus, and in that
    the converter comprises a start-up source connected in parallel with the limiting resistor and to each Grid control device for the lower transistors and configured for charging with a negative voltage when the power converter starts up.

2. Power converter according to claim 1, wherein the start-up source comprises a capacitor and a Zener diode connected in parallel and connected to the negative power supply line, and to the Grid control device for each lower transistor.

3. Power converter according to claim 2, wherein the start-up source also comprises a resistor and a diode connected, on the one hand, to the Zener diode and, on the other hand, to the limiting resistor.

4. Power converter according to claim 1, wherein the start-up source is connected to each Grid control device for the lower transistors via a resistor.

5. Power converter according to claim 1, wherein a switch is connected in parallel with the limiting resistor.

6. Power converter according to claim 1, wherein the upper transistors and the lower transistors of the switching arms are of the JFET type.

7. Power converter according to claim 6, wherein the upper transistors and the lower transistors of the JFET type are fabricated in silicon carbide or gallium nitride.

* * * * *